3,340,154
NUCLEAR REACTOR FUEL ELEMENT
ASSEMBLIES
William Norman Sinclair, Urmston, and Edward Waite, Warrington, England, assignors to United Kingdom Atomic Energy Authority, London, England
Filed Oct. 18, 1965, Ser. No. 496,956
Claims priority, application Great Britain, Oct. 30, 1964, 44,461/64
5 Claims. (Cl. 176—66)

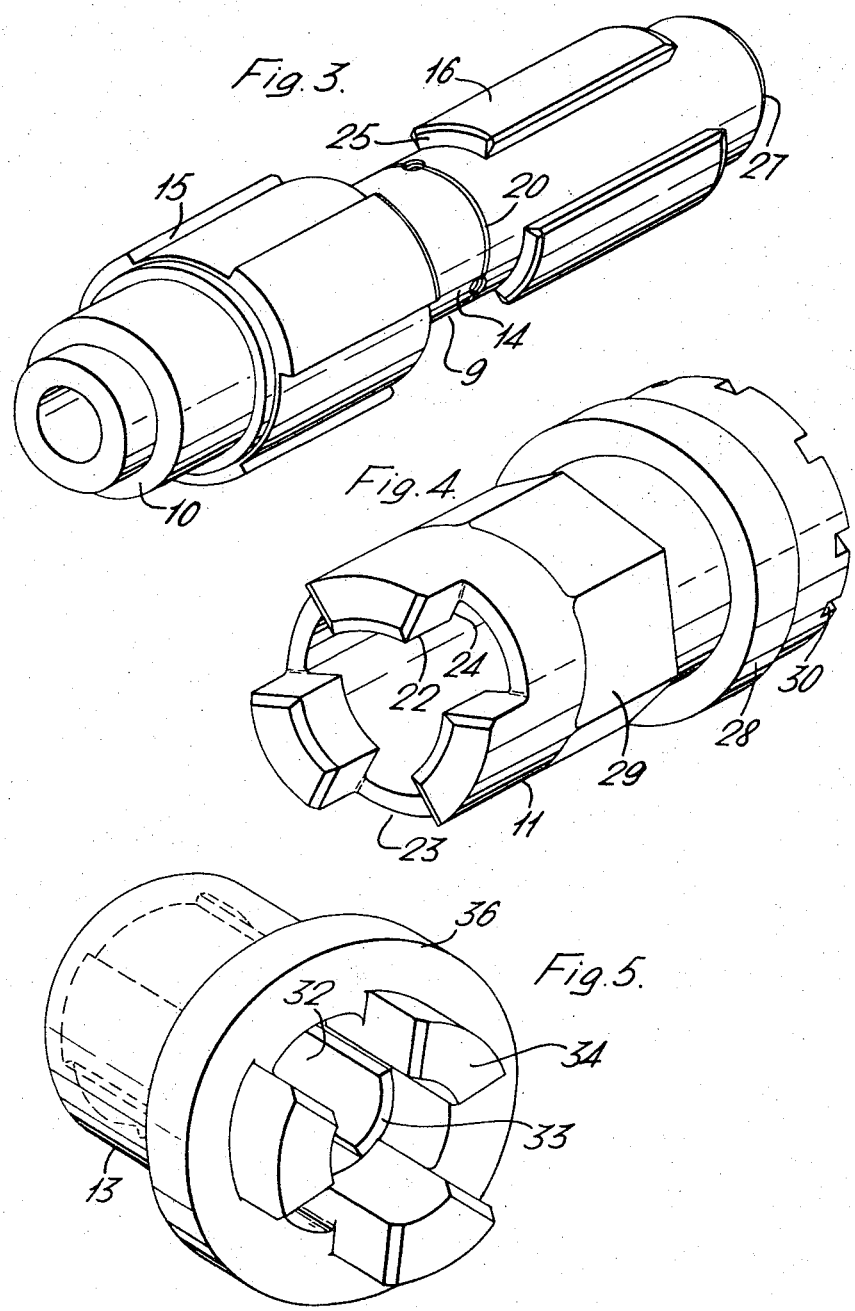

This invention relates to nuclear reactor fuel element assemblies.

In a nuclear reactor of the kind comprising a mass of moderating material penetrated by channels for housing nuclear fuel and for conducting fluid flow in heat exchange over the nuclear fuel, it is sometimes convenient to arrange the contents of each channel in a continuous linked assembly hereinafter termed a fuel stringer. A fuel stringer may comprise a fuel member or a plurality of fuel members, a neutron shield plug for preventing streaming of neutrons along the channel towards an access opening, and a seal plug for closing the access opening and, conveniently, may be withdrawn in its entirety into a fuel handling facility during servicing operations of the reactor. However, it is desirable that the non-fissile members of the fuel stringer be readily disconnectable from the fuel members and be reconnectable to new fuel members by remotely operable means but difficulty arises in providing a readily disconnectable and connectable coupling having readily applied means for locking the coupling against unintentional disconnection when the fuel stringer is in service in an operating nuclear reactor.

According to the invention, a nuclear reactor fuel element assembly comprises two sub-assemblies attached together in end-to-end relationship to form a fuel stringer by a releasable coupling comprising inter-engaging members and a locking member for disengageably securing the engagement of the inter-engaging members, and differentially thermally expanding securing means for resisting disengagement of the locking member from the inter-engaging members under operational conditions in a nuclear reactor.

The inter-engaging members may conveniently comprise a shaft and a sleeve having inter-engaging splines arranged so that the shaft can be engaged by the sleeve by relative longitudinally axial movement and secured against longitudinally axial disengagement by limited angular movement, the locking member comprising a splined locking collar longitudinally slidable on the shaft and having longitudinally axial projections for engagement with complementary recesses of the sleeve when the sleeve and shaft are longitudinally axially and angularly engaged so as substantially to prevent further relative angular movement of the shaft and sleeve, resilient means being provided for urging the collar into engagement with the sleeve, and the shaft being of material having a higher coefficient of linear thermal expansion than the material of the collar to provide the differentially thermally expanding securing means.

A construction of nuclear reactor fuel element assembly in accordance with the invention will now be described, by way of example, with reference to the accompanying drawings of which:

FIGURES 3, 4 and 5 are perspective views of members of the coupling of FIGURE 2.

Figure 1:
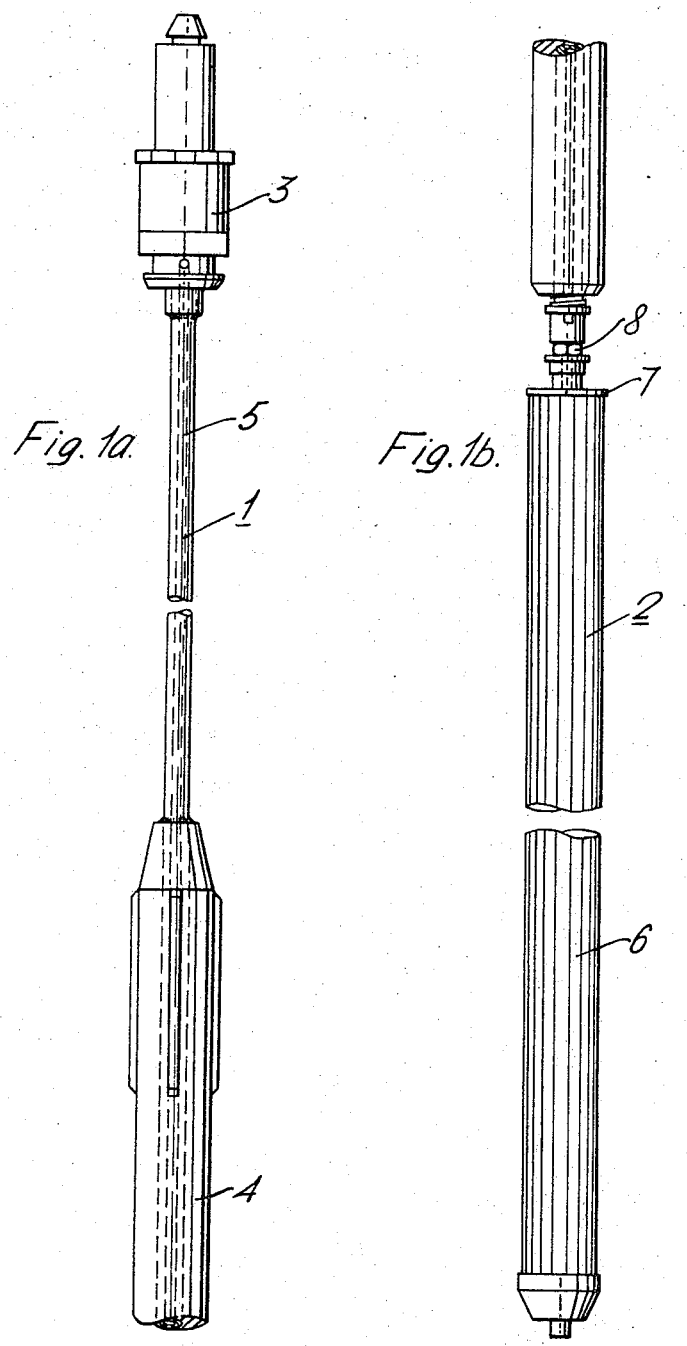
FIGURES 1a and 1b are fragmentary side views of a fuel stringer.

The fuel stringer shown in FIGURES 1a, 1b is intended to be installed in a vertical channel penetrating a mass of moderating material (not shown) of a nuclear reactor core. The stringer comprises a non-fissile sub-assembly 1 and a fuel bearing sub-assembly 2. The sub-assembly 1 includes a seal plug 3 for closing an upper access opening of the channel and a neutron shield plug 4 which is carried from the seal plug by a tubular member 5. The shield plug 4 ensleeves the tubular member 5 and is secured thereto by welding at the upper end of the shield plug. The fuel bearing sub-assembly 2 includes a cluster 6 of spaced, parallel and end supported sheathed fuel rods suspended from a top plate 7. The sub-assemblies 1 and 2 are connected by a releasable coupling 8 shown in greater detail in FIGURE 2.

The coupling 8 comprises inter-engaging members in the form of an externally splined shaft 9 and an internally splined sleeve 11, and a locking member consisting of an internally splined collar 13. The collar 13 disengageably secures the engagement of the shaft 9 and sleeve 11. Differentially thermally expanding securing means for resisting disengagement of the locking collar 13 from the shaft 9 and sleeve 11 during operation of the reactor consists in the materials of construction of the shaft 9 and collar 13 which provide for an interference fit therebetween when the coupling is at the working temperature of the reactor and a clearance fit therebetween when the coupling is at normal room temperature.

The externally splined shaft 9 is adapted by a shoulder 10 for attachment by welding at 21 to the lower end of the tubular member 5 (shown in broken line in FIGURE 2), and the internally splined sleeve 11 is adapted by a screw threaded socket 12 for attachment to the top plate 7 (shown in broken line in FIGURE 2) of the cluster 6.

Reference to FIGURE 3 shows the shaft 9 to be waisted at 14 and to have two sets 15, 16 of three splines. The shaft has a bore 17 (FIGURE 2) and has three equally angularly spaced screws 18 which serve to limit the longitudinal movement of the locking collar 13 along the shaft 9. The screws 18 have flanges 19 which are deformed into engagement with an annular groove 20 to lock the screws.

Figure 2:
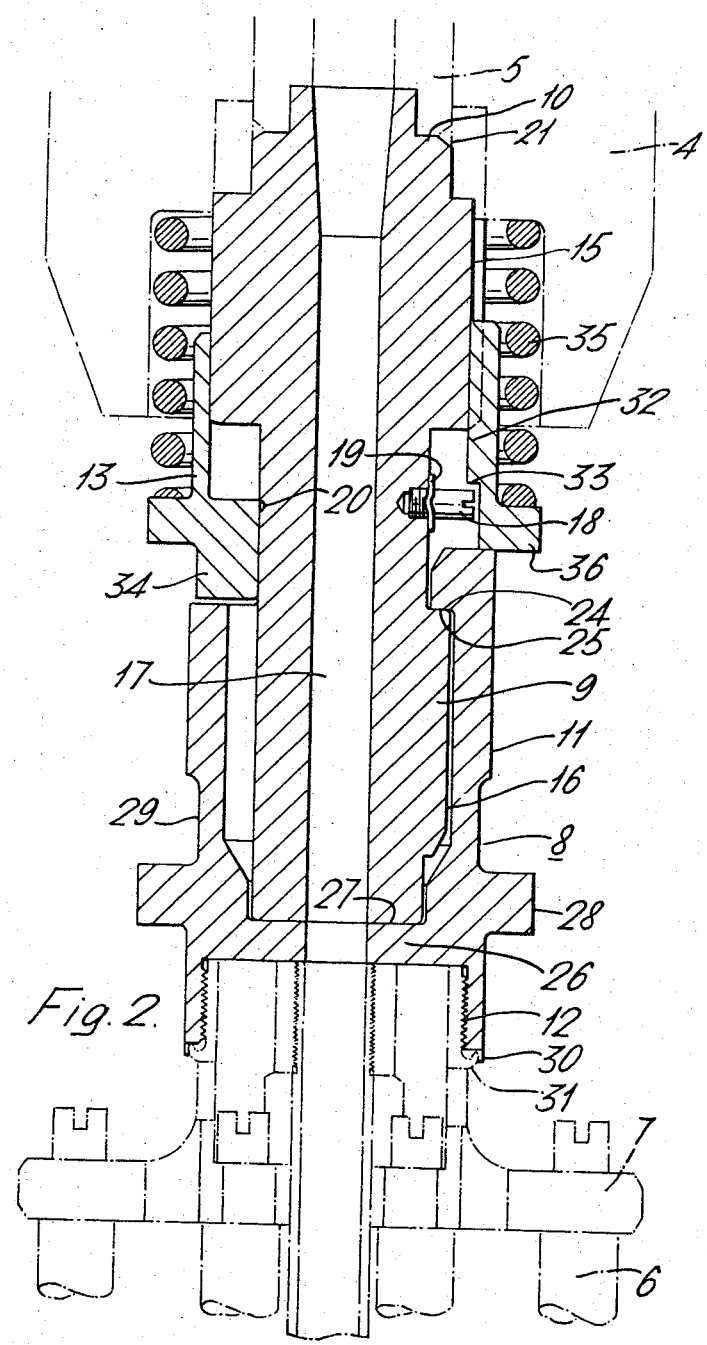
FIGURE 2 is a side view in section of a sub-assembly included in the fuel stringer of FIGURES 1a and 1b and drawn to a larger scale.

The sleeve 11 has a castellated end which defines splines 22 (complementary to the splines 16) and recesses 23. The splines 22 have end faces 24 which abut end faces 25 of the splines 16 when the shaft 9 and sleeve 11 are engaged as shown in FIGURE 2. The sleeve 11 has an internal flange 26 which may abut an end faces 27 of the shaft 9 when the shaft and sleeve are in engagement. The sleeve 11 has an external flange 28, flat surfaces defining a hexagon 29 and castellations defining notches 30 into which a lip 31 of the top plate 7 can be deformed for locking purposes.

The locking collar 13 has splines 32 complementary to the splines 15 of shaft 9. The splines 32 define an internal shoulder 33 which may abut the screws 18 to limit the longitudinal axial movement of the locking collar. End projections 34, complementary to the recesses 23, are urged into engagement therewith (when the coupling is in the engaged condition) by a spring 35 interposed between the end of the neutron shield plug 4 and a flange 36.

The shaft 9 is of 18/8 stainless steel having a coefficient of linear thermal expansion .000018 inch/inch/° C. and the sleeve 11 and the locking collar 13 are of stainless iron having a coefficient of linear thermal expansion .000012 inch/inch/° C. The distance between the end faces 25 of the splines 16 and the end face 27 of the shaft 9 and the distance between the end faces 24 of the splines 22 and the flange 26 of the sleeve 11 are of the order 2.5 inches there being a clearance of the order .002 inch when the shaft and sleeve are in the engaged position shown and at atmospheric temperature. When the shaft and sleeve are at the operating temperature of the fuel element channel (approximately 285° C.) differential thermal expansion provides for an interference fit of the order of .002 inch. The diametral dimension over the splines 15 of the shaft 9 and the complementary dimension of the locking collar 13 is of the order 2.2 inches there being a clearance fit of approximately .002 inch at atmospheric temperature and an interference fit of the order .002 inch at the fuel element channel temperature of 285° C.

Connecton of the non-fissile sub-assembly 1 (having the shaft 9 and locking collar 13 with spring 35 attached thereto) to the fuel bearing sub-assembly 2 (having the sleeve 11 attached therto) is achieved by vertically aligning the two sub-assemblies and lowering the non-fissile sub-assembly 1 axially to engage the splines 16 with the splines 22. During this operation the projections 34 of the locking collar abut the castellations defined by the recesses 23 of the sleeve 11 and the locking collar 13 is thrust relatively upwardly against the spring 35. When the end face 27 of the shaft 9 abuts the flange 26 of the sleeve 11 the non-fissile sub-assembly 1 is rotated through 60° to abut the end faces 24 of the splines 22 with the end faces 25 of the splines 16 in which position the end projections 34 of the locking collar 13 coincide with the recesses 23 of the sleeve 11 and are thrust into engagement therewith by the spring 35 thereby locking the non-fissile sub-assembly against rotation relative to the fuel bearing portion 2.

After the fuel stringer has been irradiated in a nuclear reactor core further operations are conducted by remotely operable means with the fuel stringer immersed in water which serves as a biological shield. To replace an irradiated fuel bearing sub-assembly 2 the projections 34 of the locking collar 13 are withdrawn from the recesses 23 against the spring 35 and the non-fissile sub-assembly rotated 60° and lifted to disengage the shaft 9 from the sleeve 11. The hexagon 29 is provided to enable the sleeve 11 to be held stationary whilst the non-fissile sub-assembly is rotated. The interference fits of the locking collar 13 and sleeve 11 with the shaft 9 effected by differential thermal expansion when the assembled fuel stringer is at the fuel element channel operating temperature provide additional locking means whereby disconnection of the coupling by coolant and vibration is resisted.

The bore 17 defines a passage for conducting emergency spray cooling water to the fuel cluster and the interference fit between the shaft 9 and sleeve 11 provides a substantially sealed connection between the shaft and sleeve under operating conditions.

Connection and disconnection of a non-fissile sub-assembly of a fuel stringer to and from a fuel bearing sub-assembly by remotely operable means are facilitated when the two sub-assemblies are interconnected by a coupling of the described construction.

We claim:
1. A nuclear reactor fuel element assembly comprising:
two sub-assemblies, at least one of which includes nuclear fuel,
interengaging members attached one to each sub-assembly for releasably coupling said sub-assemblies together in end-to-end relationship,
a locking member for disengageably locking the engagement of the inter-engaging members, and
thermally sensitive means for securing the locking member in locked engagement of the inter-engaging members when said sub-assemblies are installed in an operating nuclear reactor core.

2. A nuclear reactor fuel element assembly according to claim 1, wherein: said interengaging members comprise a splined shaft and a complementary splined sleeve adapted to releasably couple said sub-assemblies together in end-to-end relationship by end abutment of aligned splines; said locking member comprises a splined collar complementary to said splined shaft, said collar being adapted to prevent relative angular motion of said sleeve on said shaft by having longitudinally axial end projections for engagement with complementary recesses in said sleeve, and said thermally sensitive means consists in materials having different coefficients of thermal expansion for said shaft and said collar.

3. A nuclear reactor fuel element assembly according to claim 2 having a spring for urging said collar into locked engagement with said sleeve by engagement of said projections with said recesses.

4. A nuclear reactor fuel element assembly according to claim 2 wherein said sleeve and said shaft are of materials having different coefficients of thermal expansion, said sleeve being adapted to slide freely on said shaft at normal room temperature and to grip said shaft when installed in an operating nuclear reactor core.

5. A nuclear reactor fuel element assembly according to claim 2 having means defining a passageway extending between said two sub-assemblies through said shaft and said sleeve.

References Cited
UNITED STATES PATENTS

| | | | |
|---|---|---|---|
| 3,087,882 | 4/1963 | Martin | 176—77 |
| 3,170,848 | 2/1965 | Saunders | 176—77 |

BENJAMIN R. PADGETT, *Primary Examiner.*

M. J. SCOLNICK, *Assistant Examiner.*